(12) United States Patent
Johnson et al.

(10) Patent No.: US 8,167,244 B2
(45) Date of Patent: May 1, 2012

(54) CLASS DIVIDER FOR AIRCRAFT CABIN

(75) Inventors: Glenn A. Johnson, Rural Hall, NC (US); Randy Penley, Pfafftown, NC (US)

(73) Assignee: B E Aerospace, Inc., Wellington, FL (US)

( * ) Notice: Subject to any disclaimer, the term of this patent is extended or adjusted under 35 U.S.C. 154(b) by 963 days.

(21) Appl. No.: 12/166,004

(22) Filed: Jul. 1, 2008

(65) Prior Publication Data

US 2009/0200422 A1    Aug. 13, 2009

Related U.S. Application Data

(60) Provisional application No. 61/027,682, filed on Feb. 11, 2008.

(51) Int. Cl.
*B64D 11/00* (2006.01)
*E04H 1/12* (2006.01)

(52) U.S. Cl. .............. 244/118.5; 52/238.1; 105/344

(58) Field of Classification Search .............. 244/118.5, 244/118.6, 129.1, 122 R; 296/24.4, 24.41, 296/24.42, 24.43, 24.46; 105/344, 345, 347; 52/238.1, 239, 36.4
See application file for complete search history.

(56) References Cited

U.S. PATENT DOCUMENTS

| | | | |
|---|---|---|---|
| 5,393,013 A * | 2/1995 | Schneider et al. | 244/118.5 |
| 5,425,516 A | 6/1995 | Daines | |
| 5,577,358 A * | 11/1996 | Franke | 52/238.1 |
| 5,992,798 A * | 11/1999 | Ferry | 244/118.6 |
| 6,012,679 A | 1/2000 | Auestad | |
| 6,059,364 A | 5/2000 | Dryburgh et al. | |
| 6,173,921 B1 * | 1/2001 | Neumann et al. | 244/118.6 |
| 6,276,635 B1 * | 8/2001 | Ferry et al. | 244/118.6 |
| 6,305,644 B1 | 10/2001 | Beroth | |
| 7,055,904 B2 * | 6/2006 | Skelly et al. | 297/284.9 |
| 7,111,904 B2 * | 9/2006 | Dowty et al. | 297/313 |
| 7,419,214 B2 * | 9/2008 | Plant | 297/245 |
| D583,579 S * | 12/2008 | Pearson et al. | D6/356 |
| 7,530,529 B2 * | 5/2009 | Bock | 244/118.5 |
| 7,721,991 B2 * | 5/2010 | Johnson | 244/118.6 |
| D621,330 S * | 8/2010 | Bock | D12/345 |
| D621,331 S * | 8/2010 | Bock | D12/345 |
| 7,905,451 B2 * | 3/2011 | Schotte et al. | 244/118.6 |
| 7,975,962 B2 * | 7/2011 | Jacob | 244/118.6 |
| 2009/0224103 A1 * | 9/2009 | Neumann et al. | 244/131 |
| 2010/0065683 A1 * | 3/2010 | Darbyshire | 244/118.6 |

OTHER PUBLICATIONS

International Search Report and Written Opinion mailed Aug. 26, 2010 in International Patent Application No. PCT/US/2009/031066.

* cited by examiner

*Primary Examiner* — Timothy D Collins
*Assistant Examiner* — Joseph W Sanderson
(74) *Attorney, Agent, or Firm* — Shumaker, Loop & Kendrick, LLP

(57) ABSTRACT

A class divider for an aircraft passenger cabin is provided. The class divider includes a partition positioned immediately aft of a rear row of seats in a first predetermined class area of the aircraft cabin and an aft-facing panel having a width and height generally corresponding to a width and height of the rear row of seats. One or more passenger convenience features selected from the group of video monitors, tray tables, and magazine storage pockets are provided on the aft-facing panel for use by passengers seated immediately aft of the partition in a front row of a second predetermined class area of the aircraft cabin.

5 Claims, 4 Drawing Sheets

CLASS DIVIDER FOR AIRCRAFT CABIN

CROSS REFERENCE TO RELATED APPLICATIONS

This application claims priority to U.S. Provisional Patent Application No. 61/027,682 which was filed with the United States Patent and Trademark Office on Feb. 11, 2008.

TECHNICAL FIELD AND BACKGROUND OF THE INVENTION

This application relates to a class divider, or partition, for being positioned between business class and coach class seating sections, or the front row of the main cabin of commercial aircraft.

Many aircraft utilize a dividing structure such as a wall or a curtain to separate the class sections within the aircraft cabin. This wall or curtain may be aesthetically undesirable, especially for the front most situated passengers in a class section. Current day aircraft utilize the seat back of a front situated seat to provide passenger accessories such as a television monitor, food tray or magazine pocket to the rear situated passenger. However the frontmost seats in a class do not have access to passenger accessories due to the presence of the dividing structure. Thus a different seat is used on the frontmost row that makes a different provision for these accessories. However, these seats are often considered undesirable by passengers and require seat manufacturers to design or fabricate a relatively few front-row seats, at a considerable expense.

Accordingly, there is a need to provide a class divider that offers passenger accessories, does not require the use of separately designed seats, and is aesthetically pleasing.

SUMMARY OF THE INVENTION

Therefore, it is an object of the invention to provide a partition for an aircraft cabin.

It is another object to provide a partition for an aircraft cabin that separates that cabin from an adjacent cabin.

It is another object to provide a partition for an aircraft cabin that permits HIC testing to be completed on minimum pitch coach class seating units without interaction with the business class seats.

It is another object to provide a partition for an aircraft cabin that has the appearance of the back of a conventional aircraft passenger seat.

It is another object to provide a partition for an aircraft cabin that provides convenience features such as a video display terminal and meal table for a passenger seated in a front row behind the partition.

It is another object to provide a partition for an aircraft cabin that has an opening in the lower portion nearest the aircraft deck to provide additional foot room for a passenger seated in a front row behind the partition.

It is another object to provide a partition for an aircraft cabin that allows a standard seat to be used as the front seat in the cabin.

These and other objects and advantages of the present invention are achieved in the preferred embodiments set forth below by providing a class divider for an aircraft passenger cabin. The class divider includes a partition positioned immediately aft of a rear row of seats in a first predetermined class area of the aircraft cabin, and including an aft-facing panel having a width and height generally corresponding to a width and height of the rear row of seats. One or more passenger convenience features are selected from the following, video monitor, tray table, magazine storage pocket, or multiples thereof. The features are positioned on the aft-facing panel for use by passengers seated immediately aft of the partition in a front row of a second predetermined class area of the aircraft cabin.

According to another embodiment, the features are positioned on the aft-facing panel for use by passengers seated within the aircraft cabin.

According to another embodiment, a top end of the partition is spaced sufficiently rearward of the rear row of seats to permit seat backs of the rear row of seats to recline without interference with the partition.

According to another embodiment, the panel generally corresponds to the shape of the seat backs of the rear row of seats in a reclined position.

According to another embodiment, the panel is sinusoidal shaped and generally corresponds to the shape of the seat backs of the rear row of seats in a reclined position.

According to another embodiment, the partition includes openings in the bottom of the panel for providing storage access for use by passengers seated immediately aft of the partition in a front row of a second predetermined class area of the aircraft cabin.

According to another embodiment, a class divider for an aircraft passenger cabin is provided that includes a partition positioned immediately aft of a rear row of seats in a first predetermined class area of the aircraft cabin. The partition includes an aft-facing panel having a width and height generally corresponding to a width and height of the first row of seats, a pair of end caps each attached to the panel and forming side walls of the partition, and a planar base extending from one end cap to the other end cap. A plurality of stabilizers configured to mount within a seat track of the row of seats and extending throughout the base for providing an increased rollover moment of the panel are provided. One or more passenger convenience features selected from a plurality of video monitors, tray tables, and magazine storage pockets are positioned on the aft-facing panel for use by passengers seated immediately aft of the partition in a front row of a second predetermined class area of the aircraft cabin.

According to another embodiment, the plurality of stabilizers include aft extending feet.

According to another embodiment, the plurality of stabilizers include fore-and-aft extending feet.

According to another embodiment, a class divider for an aircraft passenger cabin is provided. The class divider includes a partition for being positioned immediately aft of a rear row of seats in a first predetermined class area of the aircraft cabin. The partition includes an aft-facing panel having a width and height generally corresponding to a width and height of the first row of seats, and a planar base attached to the panel and having a width generally corresponding with the width of the panel. A plurality of stabilizers are provided and configured to mount within a seat track of the row of seats and extend throughout the base for providing an increased rollover moment of the panel. One or more passenger convenience features are provided and are selected from the group of video monitors, tray tables, and magazine storage pockets, and are positioned on the aft-facing panel for use by passengers seated immediately aft of the partition in a front row of a second predetermined class area of the aircraft cabin.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENTS AND BEST MODE

Figure 1:
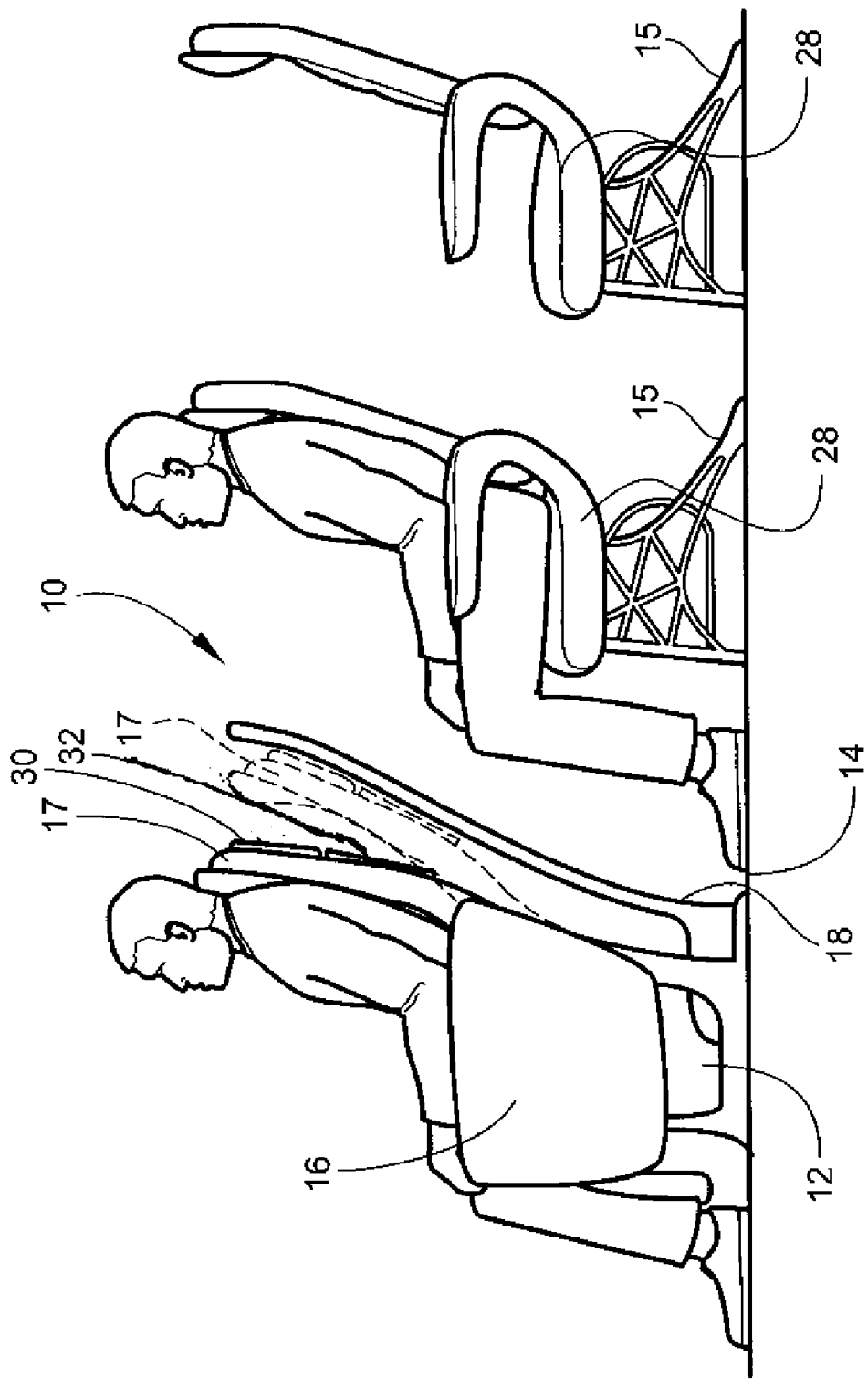
FIG. 1 is a schematic side elevation of a business class seat, partition, and two aft-positioned coach class seats according to an embodiment of the invention.

Referring now specifically to the drawings where like elements are represented by like referenced numerals, a partition according to the present invention is shown generally in FIG. 1 at reference numeral 10. In one embodiment, the partition 10 includes a plinth 12 that mounts to the aircraft deck 14 beneath a row of seats 16. The plinth 12 may be mounted to the aircraft deck 14 using conventional track fittings. The seats 16 may be mounted within seat mounts 15. The seat mounts 15 may fit within a seat track positioned on the aircraft deck 14. A partition panel 18 is mounted to the plinth 12 and is used for separating the first row of seats 16 from the coach seats 28. Passenger convenience accessories such as a video display monitor 30 and magazine holder 34 may be provided on the partition panel 18.

Figure 2:
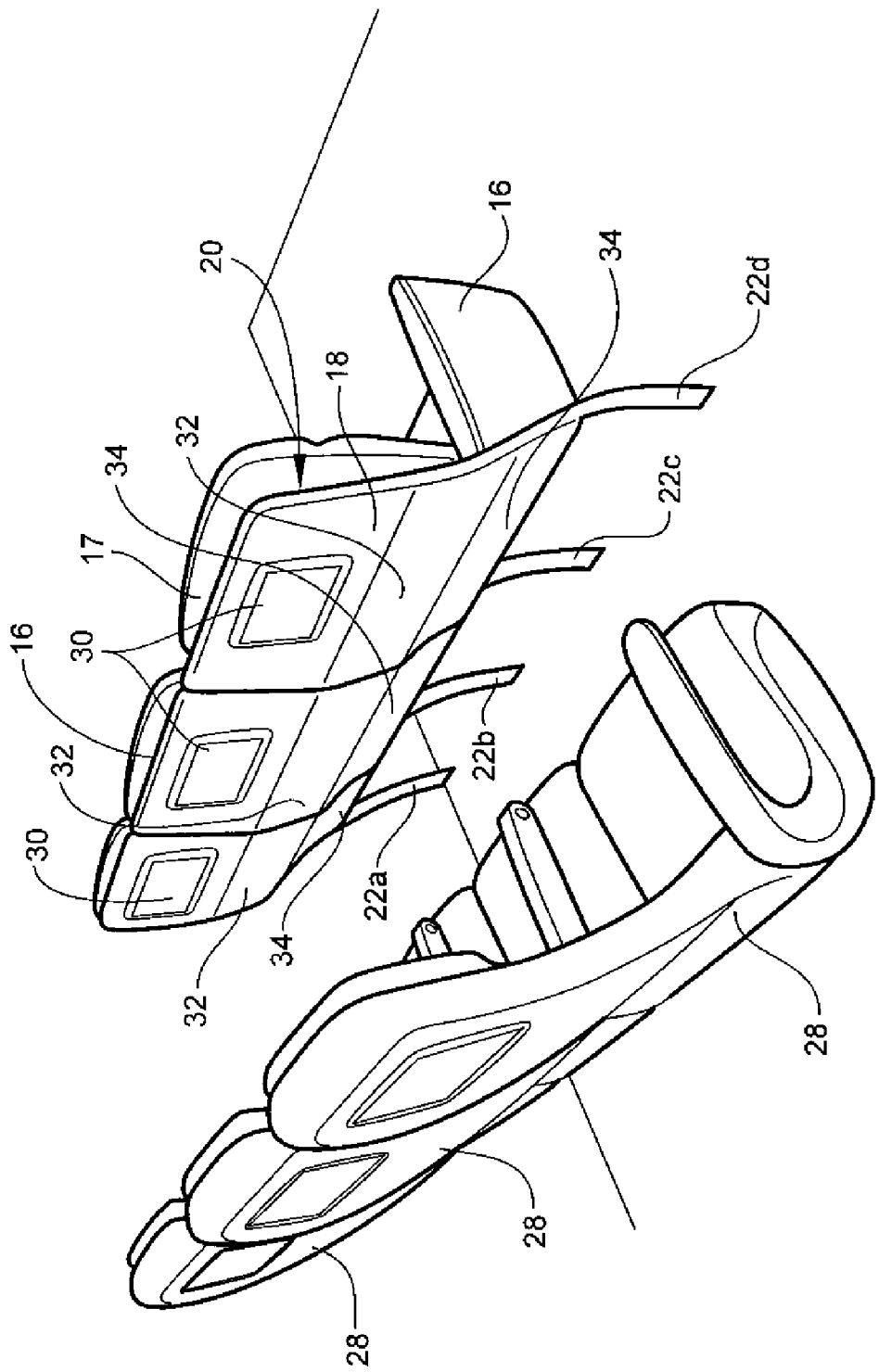
FIG. 2 is a forward-facing perspective view of a business class seat, partition and coach class seat according to an embodiment of the invention.

A partition 20 is shown according to another embodiment in FIG. 2. The partition includes a partition panel 18 that is further supported and stabilized on the aircraft deck 14 by a plurality of legs 22a, 22b, 22c, 22d. The partition 20 may have separated panels 18 that individually generally correspond with the shape and size of an individual front seat 16.

Figure 3:
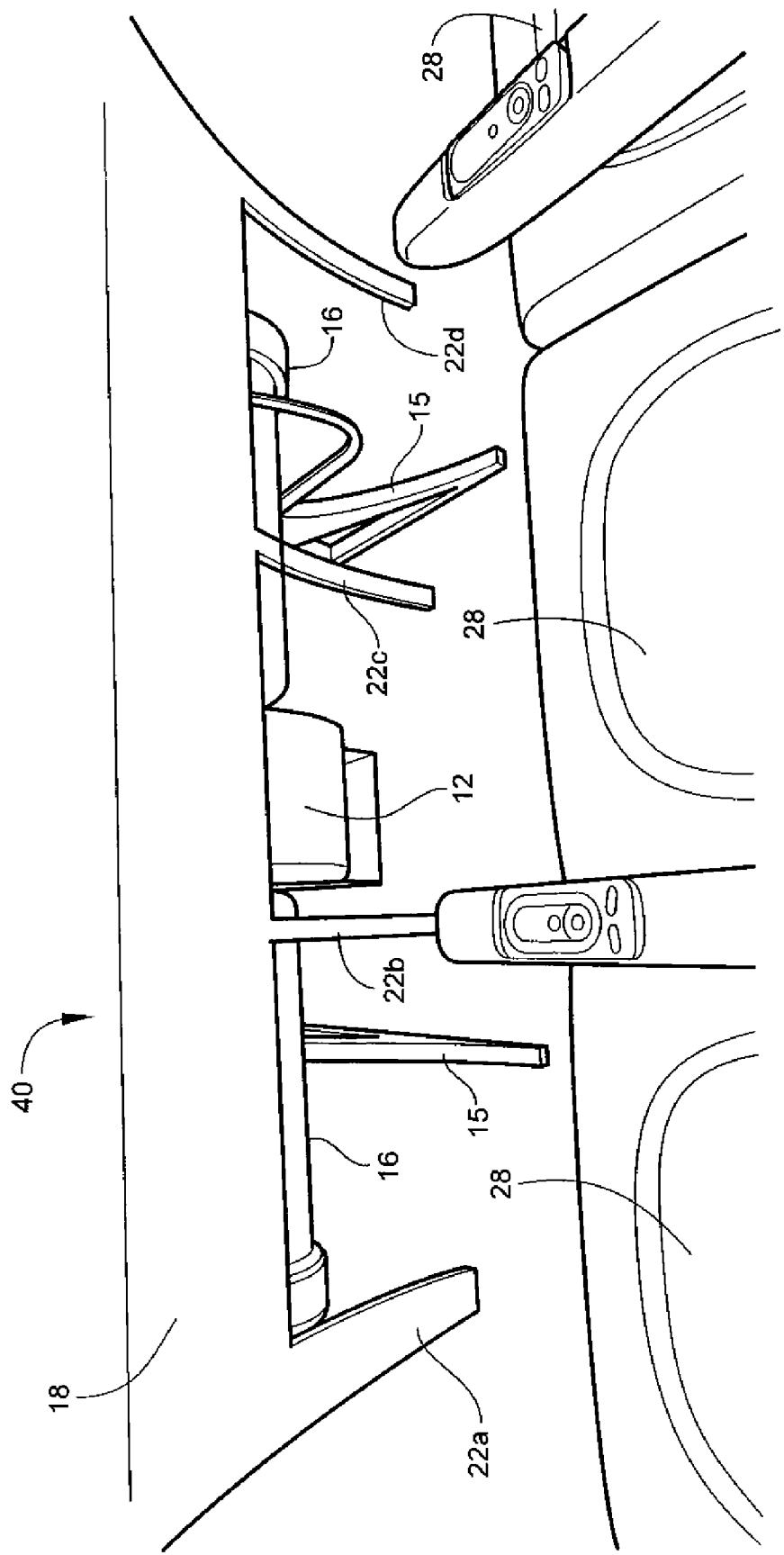
FIG. 3 is an enlarged, overhead partial view of a business class seat, partition and coach class seat according to an embodiment of the invention.

According to another embodiment shown in FIG. 3, a partition 40 may be made of a continuous panel 18 and generally correspond with the shape and size of an entire row as seats as shown in FIG. 3. The partition 40 may share the same features as the partition 20 shown in FIG. 3.

The partition panel 18 is formed in a generally sinuous shape and generally conforms to the shape of the lower portion of the seats 16, but curves back away from the seat back 17 in any suitable manner shown in FIG. 1, thus providing sufficient recline space for the forward-seated passenger. The angle of curvature of the partition panel 18 approximates the curvature of the seat back 17 sufficiently to allow maximum use of the space provided without encroaching on the aft-seated passenger. Thus, the seat back 17 can be reclined without moving rearward into the living space of the aft-seated passenger seated in, for example, a coach class passenger seat 28.

The partition panel 18 includes one or more video display monitors 30, meal tables 32 and magazine holders 34 that are each usable in the same manner as are these same features when mounted on the seat back of a forward-positioned seat.

This permits the front row of a cabin to utilize a conventional seat, instead of a special seat with meal table and/or video display monitor stowed in an armrest. The lower portion of the partition 10 between the legs 22a, 22b, 22c, 22d is open, allowing room for underseat stowage and feet of aft-seated passengers.

The partition 10 may be fabricated out of the same aircraft grade aluminum as are passenger seat frames, or may be fabricated of carbon fiber or a combination of aluminum, carbon fiber and other suitable materials.

This arrangement provides overall additional space within the cabin. The partition 10 permits the seats in the rearwardly-most business class seat row to recline in essentially the same manner as other business rows, and to do so without intruding into the living space of the aft-seated passengers, who are seated in the first row of the coach class cabin. In an alternative embodiment, the partition 10 may be placed in or behind a bulkhead separating cabin sections, or separating cabin sections from galley and restroom areas.

Figure 4:
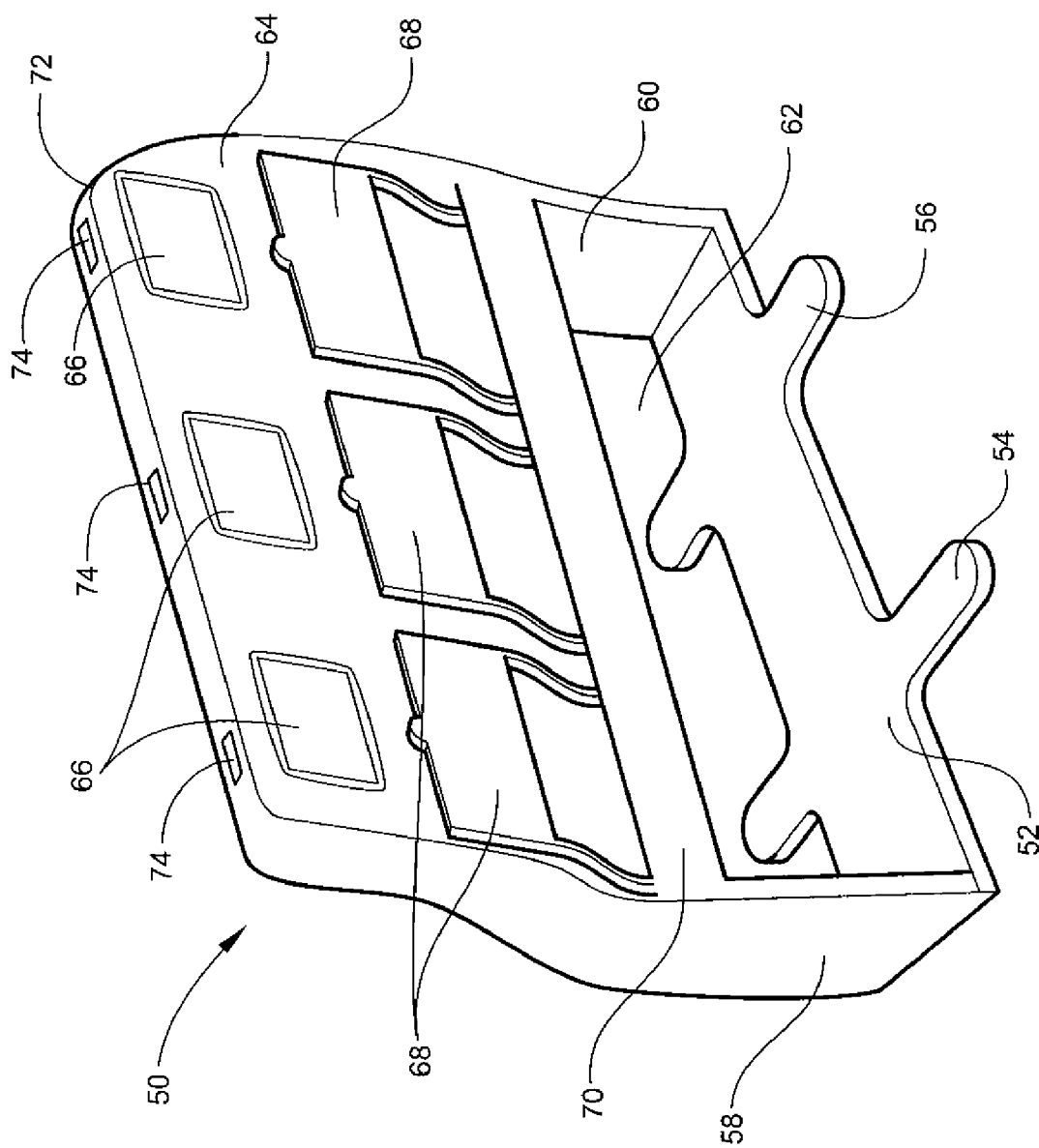
FIG. 4 is a forward-facing perspective view of a partition according to an alternative embodiment of the invention.

A further alternative embodiment of the partition is shown at reference numeral 50 in FIG. 4. In general, the same objects and advantages apply as are present in the embodiment shown in FIGS. 1-3. The partition 50 includes a base 52 having a plurality of elongate, fore-and-aft extending feet 54, 56 that mount to conventional seat track fittings, in the aircraft deck. Wiring for the partition 50 is also routed through the base 52. End caps 58, 60 define an intermediate open area 62 for the legs of the aft-seated passengers. As with partition 10, partition 50 includes a partition panel 64 mounting one or more video display monitors 66, meal tables 68 and magazine holders 70 that are each usable in the same manner as are these same features when mounted on the seat back of a forward-positioned seat. The top part 72 of the partition panel 64 functions as a hand-hold area for use the aft-seated passengers, and includes vents 74 for allowing dissipation of heat from the video display monitors 66.

One significant feature of the partitions 10, 20, 40, and 50, is that its rear-facing surface closely resembles the rear-facing side of a conventional passenger seat. This provides an aesthetic component to the invention as well as clear functional advantages over conventional bulkheads and cabin dividers. Additionally, the partition may be configured to fit any number of seats.

An improved partition for separating aircraft cabin areas is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

We claim:

1. A class divider for an aircraft passenger cabin; comprising:
    (a) a partition positioned immediately aft of a rear row of seats in a first predetermined class area of the aircraft cabin, the partition including stationary, separate aft-facing panels each substantially equivalent to a width and height of an individual seat of the rear row of seats and the panels collectively substantially equivalent to a width and height of the entire rear row of seats, the partition having legs supporting the partition separately from the rear row of seats on an aircraft deck, and the partition being separate and spaced-apart from seat backs of the rear row of seats; and
    (b) one or more passenger convenience features selected from the group consisting of a plurality of video monitors, tray tables, magazine storage pockets, and combinations thereof, positioned on the aft-facing panels for use by passengers seated immediately aft of the partition in a front row of a second predetermined class area of the aircraft cabin.

2. A class divider according to claim 1, wherein a top end of the partition is spaced sufficiently rearward of the rear row of seats to permit the seat backs of the rear row of seats to recline without interference with the partition.

3. A class divider according to claim 1, wherein the panel corresponds to the shape of the seat backs of the rear row of seats in a reclined position.

4. A class divider according to claim 1, wherein the panel is sinusoidal shaped and corresponds to the shape of the seat backs of the rear row of seats in a reclined position.

5. A class divider according to claim 1, further including openings in the bottom of the panel for providing storage access for use by passengers seated immediately aft of the partition in a front row of a second predetermined class area of the aircraft cabin.

* * * * *